United States Patent Office 2,778,344
Patented Jan. 22, 1957

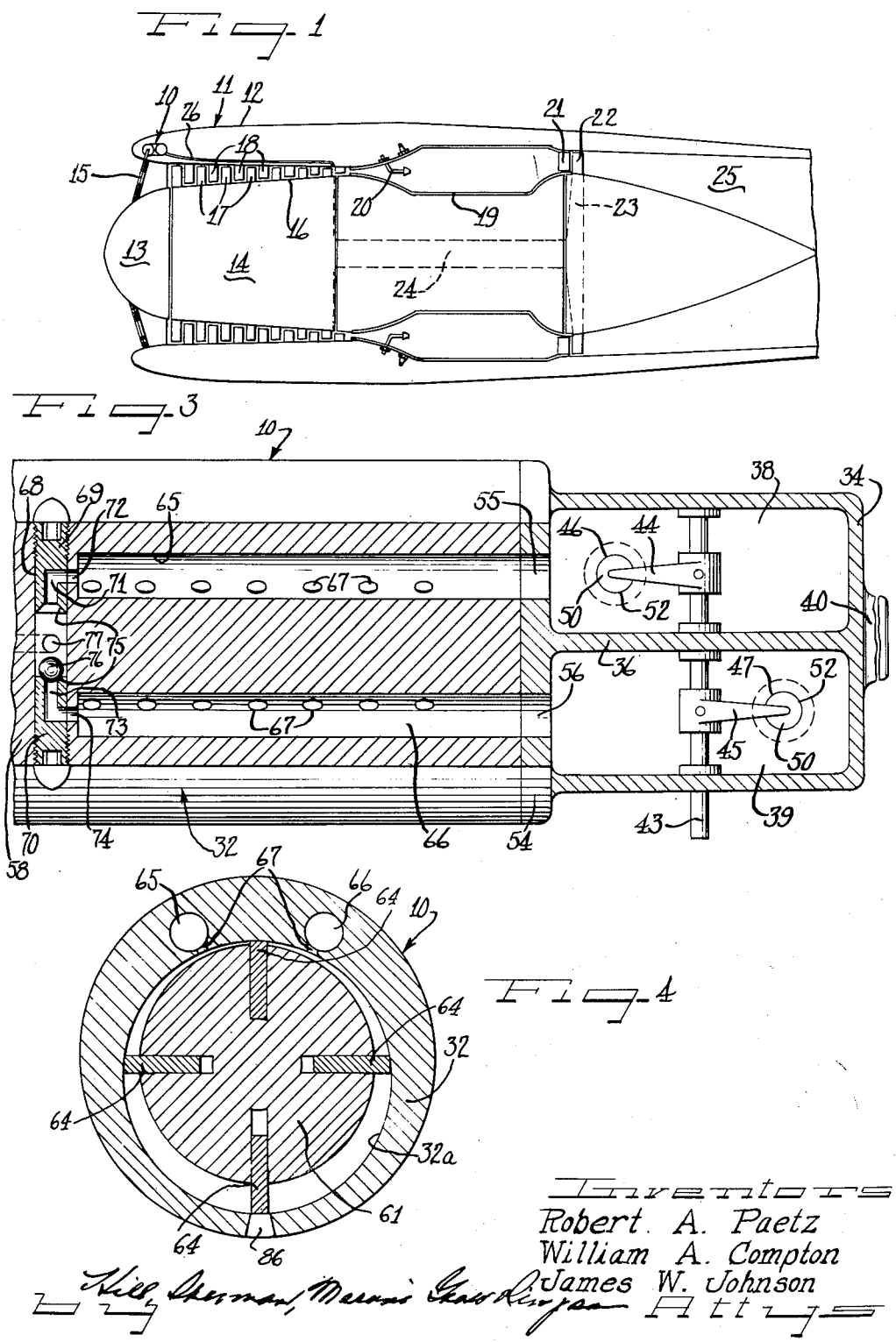

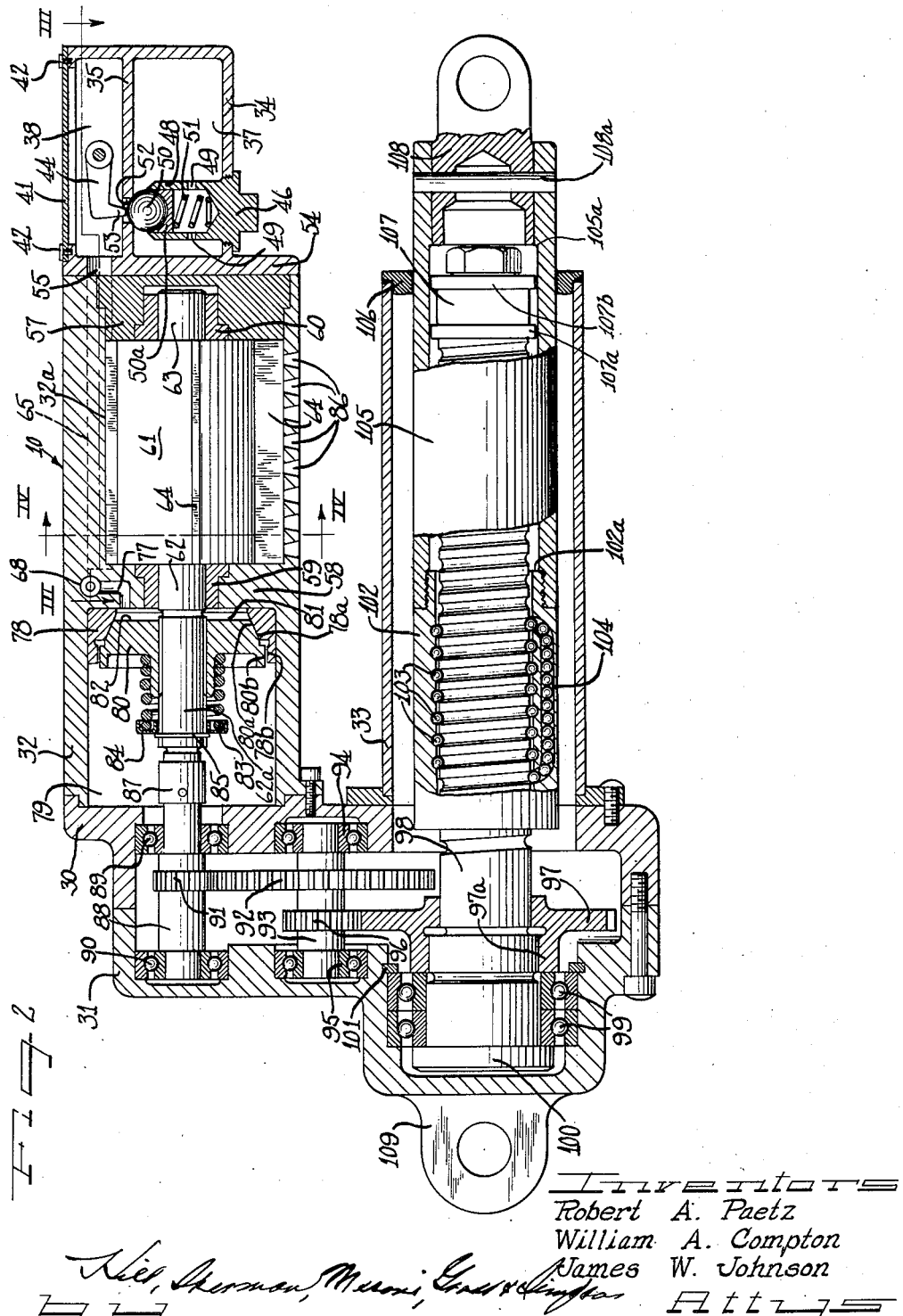

2,778,344

PNEUMATIC POWERED LINEAR ACTUATOR

William A. Compton, Euclid, James W. Johnson, Cleveland, and Robert A. Paetz, University Heights, Ohio, assignors to Thompson Products, Inc., Cleveland, Ohio, a corporation of Ohio Application November 6, 1953, Serial No. 390,580

9 Claims. (Cl. 121—39)

This invention relates to a power-transmitting device. Specifically, this invention relates to an infinitely variable positioning actuator powered by pneumatic force and adapted to withstand high temperatures.

The invention will be hereinafter specifically described as embodied in a ball nut actuator powered by a pneumatic vane-type motor but it should be understood that the invention is not limited to the particularly illustrated embodiment since the principles of this invention are generally applicable to motors which are able to withstand high-temperature conditions and to force-applying mechanisms adapted to be accurately controlled by such motors.

The power-transmitting devices of this invention are sturdy, light in weight, and are well-adapted for use on aircraft to perform such functions as actuating and accurately positioning various controls or engine parts on the aircraft. The devices of this invention are also adaptable for manual actuation in the event of failure of the pneumatic power.

A feature of the invention resides in the provision of a brake or stop mechanism for the actuator which will automatically lock the parts in adjusted position upon cessation of pneumatic pressure feed to the motor.

Since gas-turbine engines have a readily available source of compressed gases, the devices of this invention are especially adapted for usage with such engines. Thus, for example, in turbo-jet engines, the motor of the actuator of this invention can conveniently receive air from the engine compressor.

It is then an object of this invention to provide a sturdy, light-weight, reliable actuating device adapted for a reasonable service life under conditions supplying pneumatic power to the device under elevated temperatures and under surrounding high-temperature environments.

A further object of this invention is to provide a power-transmitting device adapted to be operated by high-temperature gases up to 900° F. and adapted to withstand surrounding atmospheres up to 600° F.

A still further object of this invention is to provide a device which will accurately and quickly position parts on aircraft gas-turbine engines while being operated with high-temperature gases supplied from said engines.

Another object of this invention is to provide a device which will safely withstand high-temperature environmental conditions limiting satisfactory operation of electrically and hydraulically-driven devices.

A further object of the invention is to provide an actuator having an infinitely variable positioning feature while maintaining maximum rated force throughout its entire stroke.

A specific object of the invention is to provide a pneumatic motor-operated ball nut actuator.

Other and further objects of the invention will be apparent to those skilled in the art from the following detailed descriptions of the annexed sheets of drawings which, by way of a preferred example only, illustrate one embodiment of the invention.

On the drawings:

Figure 1 is a somewhat diagrammatic, longitudinal, sectional view of a gas-turbine engine equipped with an actuator of this invention for controlling the position of inlet guide vanes on the engine.

Figure 2 is a longitudinal, cross-sectional view, with parts in elevation, of a pneumatic motor-driven ball nut actuator of this invention.

Figure 3 is a fragmentary, horizontal, cross-sectional view taken along the line III—III of Figure 2.

Figure 4 is a vertical, transverse, cross-sectional view taken along the line IV—IV of Figure 2.

As shown on the drawings:

In Figure 1, the reference numeral 10 designates generally a power-transmitting device of this invention mounted in the airframe of a turbo-jet engine 11. The engine is mounted in a hollow airframe or foil section 12 and includes a nosepiece 13 in front of the conventional axial flow compressor 14. The nosepiece 13 has guide vanes 15 controlled by the device 10. The axial flow compressor 14 includes a rotor 16 with rotor vanes 17 therearound alternating with rows of stationary vanes 18. Compressed air from the rotor 16 feeds the combustion cans such as 19. Fuel is introduced into the combustion cans 19 by means of nozzles 20 and the gases of combustion are directed out of the rear ends of the cans between stationary nozzle vanes 21 against turbine buckets 22 of a turbine wheel 23 for driving the rotor 16 through the axle 24. The gases of combustion then pass through the tail section 25 of the engine to provide the reaction thrust.

The actuator 10 is driven by compressed air from the axial flow compressor 14 and a compressed air conveying tube 26 is provided to bleed off air from the last stages of the compressor. This air may be quite hot and the device 10 is capable of withstanding operation with air up to 900° F. and in surrounding environments heated as high as 600° F.

As shown in Figures 2 to 4, the actuator 10 includes a gear box 30 closed by a cover 31 and having cylindrical casings 32 and 33 extending in parallel relation from one face thereof. The casing 32 carries a rectangular open-top valve casing 34 at its outer end.

The casing 34 has a horizontal partition wall 35 intermediate the top and bottom thereof and a vertical partition wall 36 extending upwardly from the wall 35 to the top of the casing. These partition walls divide the casing 34 into a bottom compartment 37 and a pair of top compartments 38 and 39.

A nipple 40 is provided on the rear face of the casing 34 to supply operating gaseous fluid such as air to the bottom compartment 37.

A top cover 41 is anchored to the top of the casing 34 and may be attached thereto in sealed relation as by means of screws 42 and the like.

A cross rockshaft 43 is rockably mounted in the side walls of the casing 34 and in the partition wall 36 to extend transversely across the compartments 38 and 39 about midway between the front and rear ends of these compartments. A finger 44 is secured on the shaft 43 in the compartment 38 and projects forwardly from the shaft. A similar finger 45 is mounted on the shaft 43 in the compartment 39 and projects rearwardly from the shaft.

The bottom wall of the casing 34 is tapped to carry plugs 46 and 47 immediately under the fingers 44 and 45. Each plug has a hollow open-topped shank portion 48 with ports 49 near the bottom thereof. A ball 50 is slidably guided in the shank 48 and is carried on a seat 50a urged by a spring 51 to seat in an aperture 52 in the horizontal partition wall 35. Each aperture 52 receives the downturned end 53 of a finger 44 or 45 therethrough.

The springs 51 are effective to hold the balls 50 in the mouths of the apertures 52 for sealing the compartment 37 from the compartments 38 and 39. Air or other gaseous fluid under pressure in the compartment 37 is vented through the ports 49 into the hollow shank portion 48 for assisting the spring in tightly holding the ball against its seat.

When the shaft 43 is rocked in a clockwise direction, the finger 45 will be depressed against the ball 50 to open the aperture 52 and vent the chamber 37 to the chamber 39. At the same time, the finger 44 will be raised away from the other ball member. Conversely, when the shaft 43 is rocked in a counter-clockwise direction, the finger 44 will be depressed against the ball 50 to vent the compartment 37 with the compartment 38. In this manner, the operating gaseous fluid fed to the compartment 37 through the nipple 40 is selectively bled to either the compartment 38 or the compartment 39 and in no instance are both compartments vented to the compartment 37 at the same time.

The casing 34 has a flanged front wall 54 closing the rear end of the cylindrical casing 32. This wall 54 has ports 55 and 56 therethrough respectively joining compartments 38 and 39.

The casing 32 is milled inwardly from its outer end to provide an eccentric vane motor bore 32a with a countersunk outer end portion receiving a cap 57. The bore 32a extends to a partition wall 58 having a central aperture carrying a bearing 59. A corresponding bearing 60 is carried in the cap 57 and a motor rotor 61 in the bore 32a has end journals 62 and 63 respectively mounted in the bearings 59 and 60.

The rotor 61 has a plurality of radial slots therearound each carrying vanes 64 whose outer edges ride on the bore 32a.

Longitudinal passages 65 and 66 are formed in the eccentrically bored portion of the casing 32 near the top thereof adjacent the motor bore 32a. Each of these passages has ports 67 at spaced intervals along the length thereof joining the passage with the motor bore. The passage 65 registers with the port 55 to receive actuating gaseous fluid from the compartment 38. The passage 66 registers with the port 56 to receive the fluid from the compartment 39.

Exhaust-actuating gaseous fluid from the rotor bore 32a is discharged through ports 86 in the bottom of the casing 32.

As shown in Figure 4, the passages 65 and 66 are so disposed and the ports 67 thereof are so arranged as to introduce the actuating gaseous fluid into the motor bore in opposite directions so as to drive the rotor 61 in opposite directions. Thus, when the actuating gaseous fluid is fed from the compartment 38 through the passageway 65, the rotor 61 will be driven in a counter-clockwise direction as viewed in Figure 4. Conversely, when the actuating gaseous fluid is fed from the compartment 39 through the passageway 66 and ports 67, the rotor 61 will be driven in a clockwise direction as viewed in Figure 4.

The partition wall 58 of the casing 32 has a transverse bore 68 thereacross near the top portion of the casing. Plugs 69 and 70 are threaded into the ends of this bore 68. The plug 69 has an angled passage 71 joining a port 72 in the end of the passage 65 with the bore 68. A similar angular passage 73 joins a port 74 in the end of the passage 66 with the bore 68. Each plug 69 and 70 has a valve 75 at its inner end adapted to receive a ball member 76 which rolls freely in the bore 68.

An angled passage 77 adjoins the central portion of the bore 68 midway between the valve seats 75 with the interior of an annular brake shoe or stator ring 78 bottomed against the partition wall 58 in the end of a chamber portion 79 of the casing 32. This chamber portion 79 extends from the partition wall 58 to the inner end of the casing 32 which is seated against the gear box 30.

The journal 62 has a splined drive shaft extension 62a slidably receiving in splined relation thereon a brake rotor 80.

The brake stator ring 78 has a tapered face 78a receiving the tapered face 80a of the rotor in wedge-fitting relation to form a brake lock between the rotor and stator. A space 81 is provided inside the ring 78 between the rotor 80 and the partition wall 58 to receive gaseous fluid from the passageway 77. This fluid is effective to act on the rotor face 82 for sliding the rotor on the splined shaft 62a to release the brake.

Parallel axial surfaces 78b and 80b are provided on the rotor and stator to have relatively close running clearance relation to provide a seal for the space 81 so that the pressure for unseating the rotor can be maintained after the brake is released.

A coil spring 83 surrounds the splined shaft 62a and is bottomed at one end on the rotor 80 and at the other end in a channeled washer 84 which is held axially on the shaft 62a by a snap ring 85.

The ball member 76 is effective to prevent flow of gaseous fluid between the passages 65 and 66 while at the same time, always venting the space 81 to the passage which receives the fluid. Thus, when the passage 65 is pressurized, the ball member 76 will be seated against the seat 75 of the plug 70 to prevent flow into the passage 66. However, the fluid will flow freely through the port 74 to unseat the brake 80. Conversely, when the passage 66 is pressurized, the ball will seat against the plug 69 to close the port 72 into the passage 65.

In this manner, the brake rotor 80 is automatically released to free the rotor 61 whenever either passageway 65 or 66 is pressurized and is automatically engaged when both of these passages do not contain fluid under sufficient pressure to drive the rotor 61. An accurate positioning of the rotor 61 is thereby effected and the air motor will not coast upon cessation of flow of actuating fluid.

The splined shaft 62a is joined by a coupling 87 to a gear shaft 88 carried in a ball bearing or other anti-friction bearing 89 in the gear casing 30 and a second similar bearing 90 in the cover 31. The shaft 88 has a small diameter gear 91 thereon meshing with a large diameter gear 92 on a cross shaft 93 carried by bearings 94 and 95 in the gear box 30 and cover 31 respectively. This shaft 93 also has a small diameter gear 96 thereon meshing with a large diameter gear 97 rigidly attached to a screw shaft 98 carried at one end on ball bearings 99 in the cap 31 and having a threaded shank portion projecting through the axial central portion of casing 33. A head 100 on the screw shaft 98 abuts the inner race of the ball bearings 99 on the side of the bearings opposite the gear 97 and the gear hub 97a abuts the inner race of the bearings on the side adjacent the gear. The outer race of the bearings is held in the cover 31 by a snap ring abutment 101. In this manner, the screw shaft 98 is secured against axial movement relative to the gear casing 30 and the casing 33. However, the shaft 98 is free to rotate in the casing 33.

A tube 102 is telescoped over the shank of the screw shaft 98 in the casing 33. Balls 103 ride in the ball threads of the tube and the screw shaft respectively. A return passage 104 is provided in the tube 102 for the balls 103. A ball nut assembly is thereby provided.

The tube 102 has a plain tube 105 threaded on the end thereof and freely surrounding the screw shaft 98. This tube 105 slidingly projects through a guide 106 secured in the open end of the casing 33. The screw shaft 98 has a guide collar 107 on the end thereof with spaced circumferential runners 107a and 107b riding on the inner wall of the tube 105. Shoulders 105a and 102a are provided in the tube 105 on the end of the tube 102 and in the outer end of the tube 105 respectively. These shoulders provide stops for the runners to limit the extent of elongation and contraction of the device.

An ear 108 is secured in the end of the tube 105 by a pin 108a. A similar ear 109 is formed on the cover 31 in axial alignment with the ear 108. The ear 109 is anchored to the airfoil or body 12 of Figure 1 while the ear 108 is connected to mechanism for shifting the shutter 15. It should be understood that these ears 108 and 109 provide convenient terminal fixtures for attaching the device 10 between members which are to be relatively moved.

In operation, the rockshaft 43 is rotated to direct gaseous fluid such as air under pressure from the axial flow compressor 14 of the turbo-jet engine 11 to either the compartment 38 or 39 for selective flow through either the passage 65 or the passage 66 to drive the rotor 61 in either counter-clockwise or a clockwise direction. At the same time, when the air pressure is sufficient to drive the rotor, it is also effective to compress the spring 84 and release the brake 80. The shaft 88 is thereby driven to rotate the screw shaft 98 through the reduction gear train in the gear box 30. Rotation of the screw shaft 98 will axially shift the tube 102 for varying the spacial relation between the ears 108 and 109. As soon as the shaft 43 is rotated so that both ball members 50 are seated, the air pressure holding the brake 80 in its unseated position against the load of the spring 83 will be released and the brake will immediately lock to hold the shaft 88 against further movement whereupon the gear train will effectively hold the screw shaft 98 against coasting or unauthorized rotation. The brake, however, is immediately released upon reapplication of the air pressure. Reverse rotation of the device is effective immediately by reverse rocking of the shaft 43 since the motor response to the air feed is practically instantaneous.

The air feed to the motor can be at very elevated temperatures without interfering with the efficiency of the unit. The motor itself can become heated to very high temperatures.

From the above descriptions it will, therefore, be understood that this invention provides a convenient pneumatic-powered, accurately controlled actuator capable of quickly delivering lineal power.

It will be understood that modifications and variations may be effected without departing from the scope of the novel concepts of the present invention.

We claim as our invention:

1. A pneumatic-powered linear actuator adapted for high temperature operation which comprises a reversible pneumatic motor, means for selectively feeding a gaseous fluid under pressure to drive said motor in opposite directions, a motor brake, a pneumatic release for said brake effective to free the motor whenever gaseous fluid is fed to said motor under sufficient pressure to drive the motor, a reduction gear train driven by said motor, and an extensible screw mechanism driven by said gear train to deliver linear actuating power.

2. A pneumatic actuator which comprises a pneumatic motor adapted to withstand operation with high-temperature gases, said motor having a pair of inlet ports respectively positioned for driving the motor in opposite directions, valve mechanism for selectively feeding a gaseous fluid under pressure to said inlet ports, a reduction gear train driven by said motor, and extensible mechanism driven by said gear train to deliver motivating power in a substantially linear direction.

3. A fluid pressure-driven mechanical actuator adapted for pneumatic operation at elevated temperatures which comprises an air motor, a pair of inlet ports for said motor positioned to feed air to the motor for driving the motor in opposite directions, valve mechanism for selectively feeding air to said ports, a spring-loaded brake for said motor, pneumatic means for releasing said brake whenever air under pressure is fed to said motor in sufficient amount to drive the motor, a gear reduction train driven by said motor, and a ball nut screw assembly driven by said train for delivering axial motivating force.

4. An actuator adapted for pneumatic operation at elevated temperatures which comprises a gear box, a gear reduction train in said gear box, a screw driven by said train, a ball nut actuated by said screw, a first fixture on said gear box, a second fixture on said ball nut in axial alignment with said first fixture, movement of said screw controlling the spaced relationship of said first and second fixtures, an air motor, a pair of inlet ports for said motor positioned to feed air to the motor for driving the motor in opposite directions, an exhaust outlet for said motor, valve mechanism for selectively feeding air to said inlet ports, and means for actuating said valve mechanism whereby one inlet port will be vented to a source of air under pressure while the other inlet port is sealed from said source.

5. A linear actuator adapted to withstand high temperatures which comprises a gear box, a reduction gear train in said box, a pair of cylindrical casings projecting from said box in spaced parallel relation, a ball nut and screw assembly in one casing having the screw thereof driven by said gear train, an air motor in the other casing driving said gear train, and means for selectively feeding air to drive said motor in opposite directions.

6. A pneumatic-powered linear actuator adapted for high temperature operation which comprises a gear box, a gear train in said gear box, a pair of casings mounted on said gear box and projecting therefrom in parallel spaced relation, a screw actuator in one casing having a fixture on the end thereof projecting from said one casing, a second fixture on said gear box in substantial axial alignment with the first fixture, an air motor in the other casing driving said gear train for controlling said actuator, a brake mechanism in said other casing for locking said air motor, valve mechanism for selectively feeding air to said motor to drive the motor in opposite directions, and pneumatic release means for said brake effective to free the motor whenever air under pressure is delivered to one of said inlets under sufficient force to drive the motor.

7. An actuator adapted for high temperature operation which comprises a gear casing, a gear train rotatably mounted in said casing, a pair of casings mounted on said gear casing and projecting therefrom in spaced substantially parallel relation, an eccentric pneumatic motor bore in one casing, a rotor in said bore, a pair of inlet passages in said casing communicating with said bore to feed air under pressure to drive the rotor in opposite directions, valve mechanism for selectively feeding the air to said inlet passages, an outlet port in the side wall of said casing for said motor, a brake in said casing, a spring urging said brake into closed position for locking the motor against rotation, means venting both of said inlet passages to said brake for release of the brake, a valve in said means effective to seal one of said inlet ports while joining the other inlet port with said means, means coupling said motor with said gear train, a ball screw driven by said gear train and projecting into the other casing, a ball nut surrounding said ball screw, balls connecting said screw and nut, a first fixture on said nut projecting through the end of said second casing, and a second fixture on said gear box aligned with said first fixture, operation of said motor driving said screw through said gear train to control the spacing of said first and second fixtures.

8. A pneumatic actuator adapted for high temperature operation which comprises a gear casing having gear shafts therein, a reduction gear train in said casing carried by said shafts, a pneumatic motor casing mounted on said gear casing, a pneumatic motor in said pneumatic motor casing having a rotor coupled to a gear shaft in said gear casing, a ball nut screw casing on said gear casing, a screw rod rotatably supported in said gear casing and projecting into said ball nut screw casing, said screw rod driven by a large gear in said gear casing, a ball nut on said screw rod projecting through said ball nut casing and surrounding said screw rod, ball members connecting the ball nut and screw rod, an attachment fixture on said ball nut projecting from said ball nut casing, a second attachment fixture on said gear casing in substantial axial alignment with said first fixture, a valve casing on said pneumatic motor casing having an inlet compartment and a pair of outlet compartments, valve means selectively joining the inlet compartment with an outlet compartment, said pneumatic motor having a plurality of inlet ports positioned to drive the motor in opposite directions, said pneumatic motor having an exhaust port spaced from said inlet ports, and means for selectively actuating said valve means to feed air to the pneumatic motor for driving the rotor thereof in opposite directions.

9. A pneumatic-powered linear actuator adapted for high-temperature operation which comprises a main casing, first and second gear shafts rotatably mounted in said main casing, said first gear shaft having a small gear thereon, said second gear shaft having a large gear meshed with said small gear and having a small gear spaced from said large gear, a screw rod rotatably mounted in said casing, a large gear meshed with the small gear on said second shaft in said casing, a ball nut surrounding said screw rod, a tubular casing projecting from said gear casing and surrounding said ball nut, guide means on said tubular casing slidably guiding the ball nut, means projecting from the tubular casing for attaching the ball nut to deliver power, a tubular motor casing projecting from said gear casing, an air motor in said motor casing having a rotor coupled with the first gear shaft, a pair of inlet ports in said air motor casing for delivering air to said rotor to drive the motor in opposite directions, valve mechanism on said motor casing for selectively feeding air to said ports, an air release brake in said motor casing, valve mechanism selectively connecting said air release brake to one of said ports while sealing the brake from the other of said ports, a spring for holding said brake in locked position, and said brake being released when air for driving said rotor is fed to one of said inlet ports.

References Cited in the file of this patent
UNITED STATES PATENTS

| | | |
|---|---|---|
| 1,077,862 | Stafford | Nov. 4, 1913 |
| 2,243,656 | Shannon | May 27, 1941 |
| 2,352,140 | Trott | June 20, 1944 |
| 2,398,841 | Morris | Apr. 23, 1946 |
| 2,403,924 | Herman | July 16, 1946 |
| 2,479,794 | Triplett | Aug. 23, 1949 |
| 2,590,251 | Hoover | Mar. 25, 1952 |